United States Patent [19]
Donaldson et al.

[11] 3,862,037
[45] Jan. 21, 1975

[54] FLUID DIVERTER DEVICE

[75] Inventors: Desmond McIntosh Donaldson, Milton, Ontario; Gregory Stephen Trusxott Millard, Toronto, Ontario, both of Canada

[73] Assignee: Borg-Warner Corporation, Chicago, Ill.

[22] Filed: Apr. 16, 1973

[21] Appl. No.: 351,755

[52] U.S. Cl. ............... 210/152, 210/168, 210/181
[51] Int. Cl. ............................................. B01d 35/18
[58] Field of Search .......... 210/168, 152, 181, 186, 210/440, 443, DIG. 3, 232, 456, 479, DIG. 17; 165/119; 184/6.24, 104 B; 236/34, 34.5

[56] References Cited
UNITED STATES PATENTS

| | | | |
|---|---|---|---|
| 1,928,931 | 10/1933 | Fisher | 123/196 |
| 2,068,394 | 1/1937 | Burckhalter et al. | 210/181 X |
| 2,275,481 | 3/1942 | Wilkinson | 210/168 X |
| 2,307,300 | 1/1943 | Ramsaur | 236/34 X |
| 3,076,551 | 2/1963 | Humbert, Jr. | 210/232 |
| 3,463,317 | 8/1969 | Prier | 210/152 |
| 3,473,664 | 10/1969 | Hultgren | 210/443 X |

*Primary Examiner*—Granville Y. Custer, Jr.
*Assistant Examiner*—Craig R. Feinberg
*Attorney, Agent, or Firm*—James A. Geppert

[57] ABSTRACT

A fluid diverter device in the form of means positioned in a fluid path flowing between a fluid source and a fluid usage or treating unit and designed to direct the flowing stream to a fluid processing apparatus and to return the processed fluid back to the fluid path.

19 Claims, 5 Drawing Figures

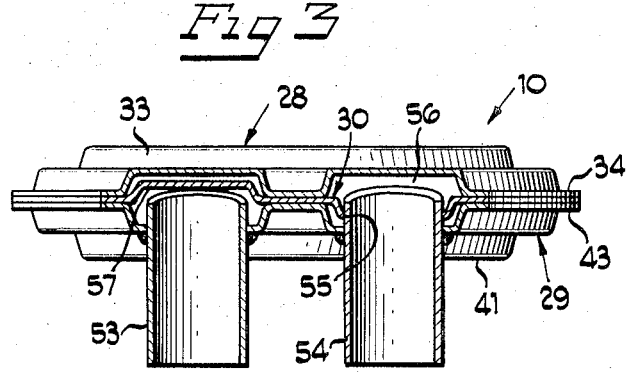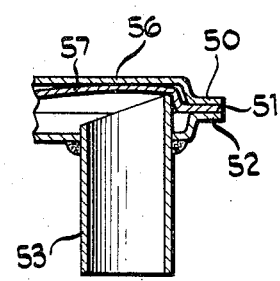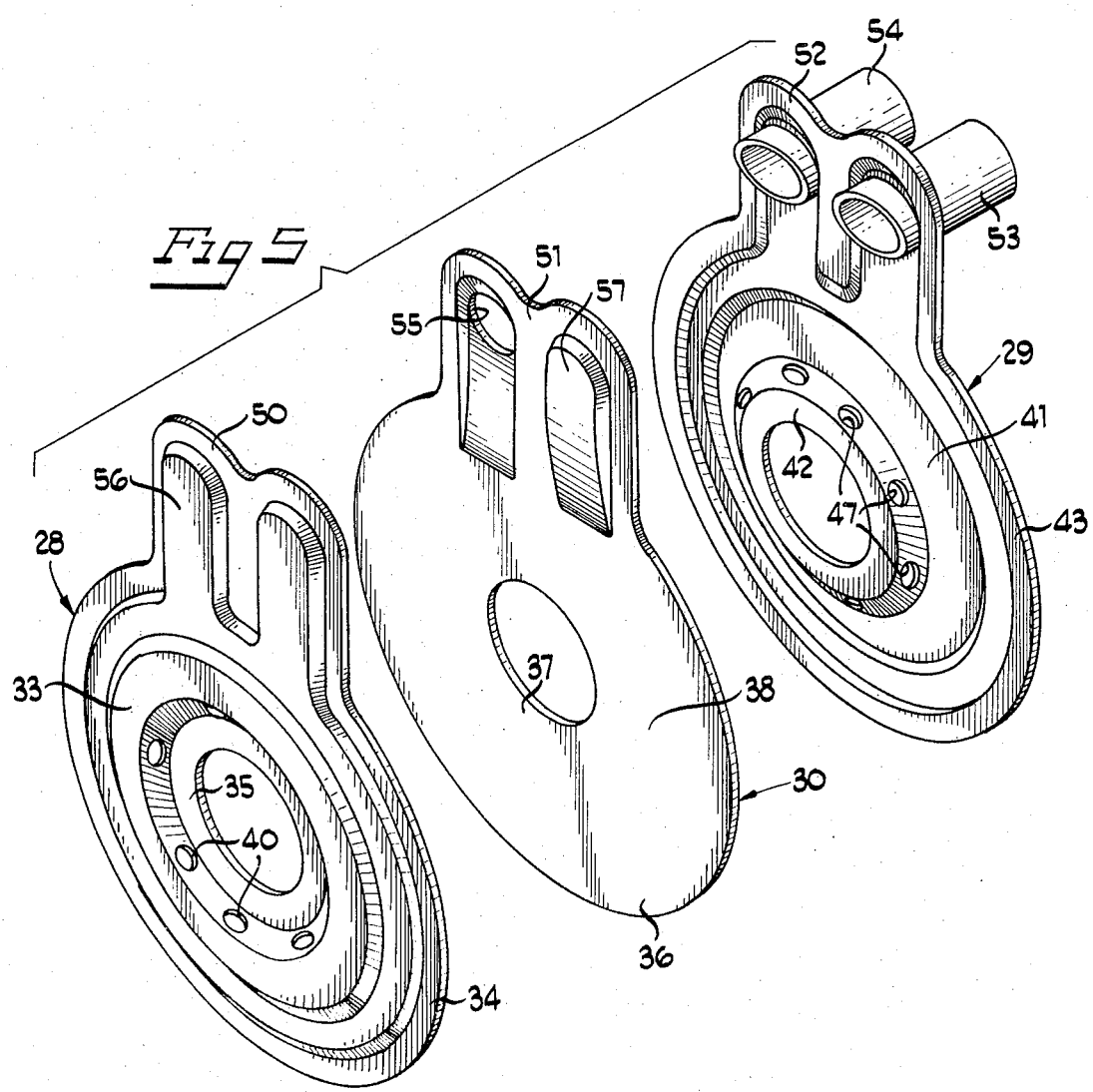

FLUID DIVERTER DEVICE

BACKGROUND AND SUMMARY OF THE INVENTION

This invention relates to an improved fluid diverter device and more particularly to a fluid diverter device operable to divert fluid from a flow path for observation, testing, or treatment and to return the fluid to the path.

In certain exemplary hydraulic and other fluid flow systems, the systems connect fluid usage and/or treating units and it is frequently desirable to divert the fluid, issuing from one unit, to an apparatus for observation, testing, or treatment and then to return the fluid to the other unit. One well-known arrangement consists in diverting a stream of lubricating oil of an internal combustion engine to a temperature-regulating heat exchanger to insure satisfactory flow and lubricating properties of the oil prior to flow of the treated oil stream to a filter for clarifying and purifying the oil. For this purpose, the diverter may be in the form of an adapter unit making it possible, in any closed engine lubricating arrangement having a spin-on type of filter, to add a cooling device to an existing filter system without altering the filter or the engine to which the filter is usually attached. While such adapter units have been satisfactory for their intended use, these units are composed of die-cast casings of a complex and intricately-formed structure for defining fluid passages and ports. The die-cast structure requires numerous and careful machining and drilling operations, with consequent expensive manufacturing costs. In addition, car manufacturers employ different engines so that it is presently necessary to provide several models of adapter units to insure proper individual fitting of the adapter units to the engines. Also such known adapter units are bulky and, since space limitations are critical for accommodating and mounting adapter units relative to the engines and filters, compactness of such adapter units is imperative.

The primary object of the present invention is to provide an improved fluid diverter device for diverting fluid from a predetermined flow path to a processing apparatus, for example a heat exchanger, and return the fluid to the flow path.

Another object of the invention is to provide an improved fluid diverter device simple in construction, compact in assembly, inexpensive to manufacture, and efficient in operation, use and service.

Another object of the invention is to provide an improved fluid diverter device adapted to be positioned between and connected to an engine and a lubricant oil filter and operative to divert lubricant oil from the engine to a heat exchanger for conditioning the temperature of the oil and to return the conditioned oil to the filter.

A specific object of the invention is to provide an improved fluid diverter device of simple and inexpensive construction comprising three main component members, which may be formed of thin plastic or sheet metal stampings, including identically formed closure members, and a baffle member disposed between theh closure members to provide spaced fluid chambers forming flow passages respectively connected to and in communication with inlet and outlet passages in one of the closure members. In its exemplary embodiment of the invention, the device is adapted to have one of its closure members engage an engine block and be provided with openings for passage of engine lubricant into one of the compartments for flow to the outlet passage and to a heat exchanger for temperature conditioning, the conditioned oil returning through the inlet passage to the other compartment connected to an oil filter, the control device having a threaded fitting connecting the filter and engine for flow of filtered oil to the engine. Radially spaced seals in the closure member are provided to universally adapt the device to engage one or the other of different size oil filter mounting openings in the engine. Since the closure and baffle members are thin, the device has maximum compactness desirable for accommodation in the limited space normally available in automotive engine enclosures.

Other objects and advantages of the invention will be apparent from the following detailed description of a preferred embodiment thereof when taken in conjunction with the drawings.

DESCRIPTION OF THE DRAWINGS

FIG. 3 is a section view, taken on line 3—3 of FIG. 1 of the fluid diverter device.

FIG. 4 is a sectional view, taken on line 4—4 of FIG. 1 of the fluid diverter device.

FIG. 5 is an exploded view in perspective showing the component parts of the fluid diverter device.

DESCRIPTION OF THE PREFERRED EMBODIMENT

Figure 1:
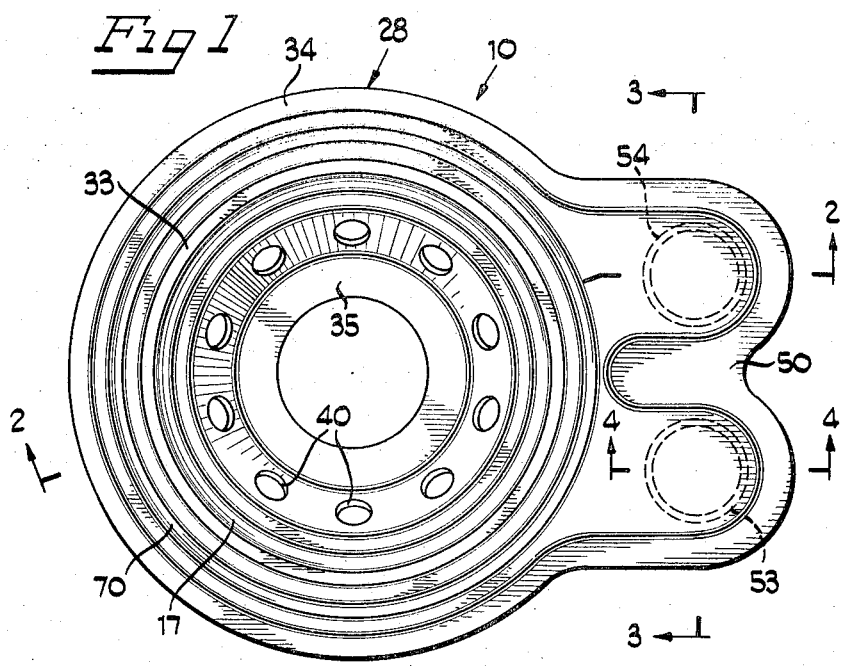
FIG. 1 is a top plan view of the fluid diverter device of the present invention.
Figure 2:
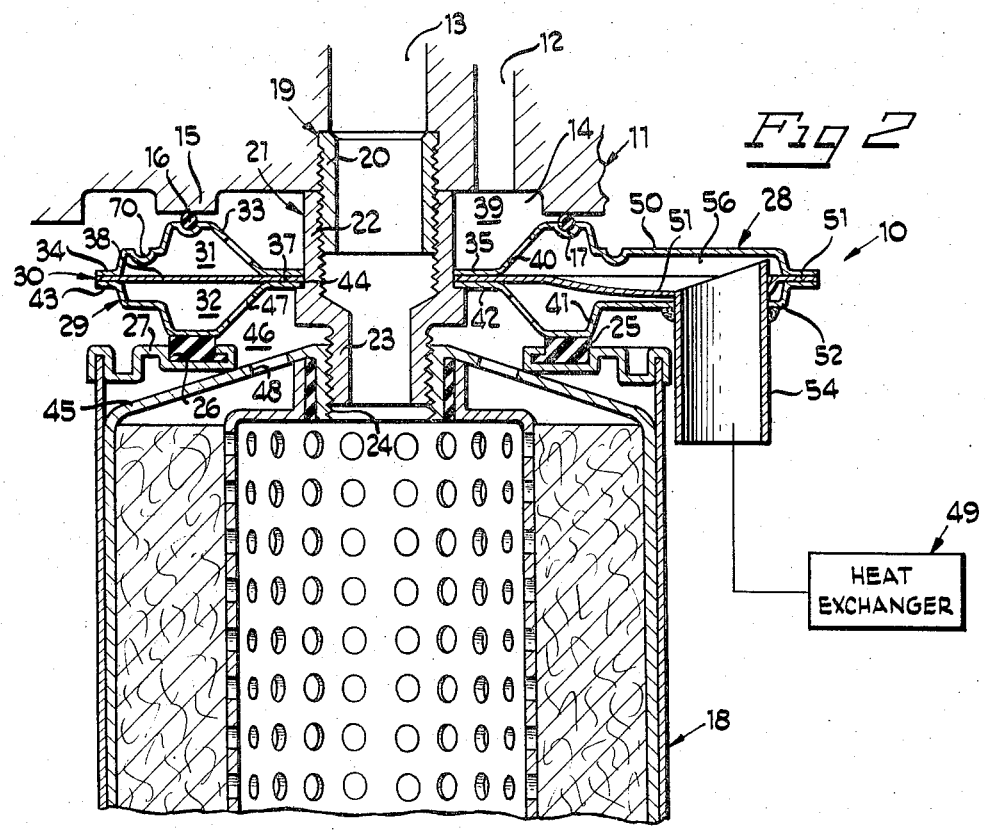
FIG. 2 is a sectional view, taken on line 2—2 of FIG. 1, and illustrating the fluid diverter device positioned between and connecting a conventional internal combustion engine and lubricating oil filter.

Referring now to the drawings, the illustrated fluid diverter device of the present invention is generally designated by the reference numeral 10. As shown in FIG. 2, device 10 is adapted to be positioned in proximity to a standard automotive engine block 11 having a lubricating oil system including oil passages 12 and 13 communicating with a circular pocket 14 defined by an annular collar 15 integral with the block 11, an O-ring 16 being seated in a groove 17 in the upper surface of the device 10 and engaging the collar 15 to provide a seal between the engine block 11 and device 10. The passage 12 in block 11 is connected to an engine oil pump (not shown) for conducting oil under pressure into the pocket 14. The passage 13 is located centrally of the circular pocket 14 and is connected to a conventional oil filter 18 by a nipple 19 in threaded engagement with a bore 20 in block 11 at the end of passage 13 and by a tubular connector fitting 21 forming a component part of the device 10 and having an internally threaded cylindrical portion 22 in engagement with the nipple 19 and an exteriorly threaded reduced cylindrical portion 23 screwed into the internally threaded bore 24 in the oil filter 18. The oil filter is provided with a suitable compressible gasket ring 25 carried in a groove 26 formed on the end wall 27 of the filter and sealingly engaging the diverter device 10. The engine block 11, filter 18 and device 10 are thus held in assembly by their described connection to each other and for a purpose that will become apparent from the following description of the specific construction and function of the fluid diverter device.

The fluid diverter device 10 is designed to function to divert lubricating oil, usually flowing normally in a predetermined flow path from the engine to the filter, from this flow path by conducting the oil from the engine to processing apparatus, which in the present example, is a heat exchanger for conditioning the temperature of the oil and transfer of the oil to the oil filter 18 for filtration and return to the engine. More specifically, the fluid diverter device 10 comprises a hollow casing provided by closure members 28 & 29, a baffle member 30 being positioned in the casing between the closure members and forming therewith upper and lower annular fluid chambers 31 and 32. The closure member 28 is formed as an annular dished plate providing a crown 33, radially outer and inner flat rims 34 and 35 of the plate engaging complementary rims 36 and 37 of the flat body portion 38 of the annular baffle member on plate 30 to thereby define the upper fluid compartment 31. The crown 33 of the closure member 28 is provided with groove 17 for O-ring 16 engaging the collar 15 of engine block 11 to prevent leakage of oil from a fluid compartment 39 formed by crown 33, engine block 11 and nipple 21. The crown 33 of closure member 28 is provided with a plurality of openings 40 in annular array for passage of oil from compartment 39 to chamber 31. Closure member 29 is a dished plate formed in the same plastic mold or sheet metal die as the plate 28, and, accordingly, has an annular crown 41, and radially inner and outer flat rims 42 and 43 engaging complementary rims of the flat body portion 38 of baffle plate 30 to define the lower fluid chamber 32. The rim 42 of closure member 29 is seated on and is in fluid-tight engagement with a shoulder 44 on fitting 21. The crown 41 engages gasket 25 and defines, with fitting 21 and walls 27 and 45 of filter 18, a fluid compartment 46 in communication with chamber 32 and the interior of the filter 18 via openings 47 in crown 41 and openings 48 in wall 45 of filter 18.

It is believed apparent that the single baffle member or plate 30 is effective to provide two distinct and separate fluid chambers (31, 32) in the fluid diverter device. The chamber 31 receives lubricating oil from the engine via compartment 39 and the oil flows to a heat exchanger 49 for cooling. The chamber 32 is connected to the heat exchanger and receives the cooled oil for transfer via compartment 46 to the oil filter 18. To provide for this flow of oil through and from the fluid diverter device 10, the closure plates 28 and 29 and baffle plate 30 are formed with coextensive engaged tabs 50, 51 and 52, respectively projecting from the crowns 33 and 41 and body portion 38 and formed to provide passages from chambers 31 and 32 to tubes 53 and 54 fixed to plate 29 and connected to the heat exchanger 49. More particularly, as best illustrated in FIGS. 3 and 5, the tube 54 is connected to and projects through tab 52 of the plate 29 and through an opening 55 in tab 51 of plate 30 and into a recess 56 in tab 50 of plate 28 in fluid communication with chamber 31 of the fluid diverter device 10 whereby oil in chamber 31 flows into the recess 56 and into the tube 54 to the heat exchanger. The tube 53 is connected to and projects through tab 52 of plate 29 into a recess 57 in baffle plate 30 in fluid communication with chamber 32 so that oil flows from heat exchanger 49 and through tube 54 into the recess 57 and chamber 32 and compartment 46 into the oil filter.

The described fluid control device of the present invention, due to the simplicity of its components, can be readily and inexpensively manufactured since the closure and baffle plates can be molded of plastic and connected together, or may be sheet metal stampings such as aluminum, connected by an aluminum bonding process. The closure plates are formed identically and used in inverted pairs after performing additional minor operations including forming grooves 17 and 70 in one of the plates and providing openings for tubes in the other plate. The closure and baffle plates are self-locating for easy assembly. The assembly is sufficiently compact for accommodation in locations having critical space limitations. The baffle plate provides the multiple use of interrupting and separating the incoming oil from the outgoing oil, since it cooperates with the closure plates to provide two chambers and serves to function, in effect, as two baffles bridged to permit manufacture as a single piece. In addition, the grooves 17 and 70 in plate 28 provide alternate O-ring locations suitable for adaptation of the device to substantially all American engines. A further important feature is the inlet and outlet tubes are parallel to the axis of the oil filter. It should be recognized, however, that in environments where space permits or makes it desirable, the tubes 53 and 54 may be designed to extend in the direction of the plane of the baffle plate 30.

While the improved fluid diverter device has been disclosed in a preferred embodiment of the invention as diverting lubricant oil, from its normal flow path between an engine and filter, to a heat exchanger for controlling the temperature of the oil and return to the filter, it is believed to be readily apparent the fluid diverter device may be utilized in many other applications requiring diversion of other fluids than oil from a predetermined flow path to a processing or treating apparatus and return of the fluid to the flow path, and, accordingly, with this concept in mind, the scope of the appended claims should be construed as broadly as the prior art will permit.

We claim:

1. A fluid diverter device adapted to be disposed in a fluid flow path and to divert fluid to a fluid treating apparatus and return it to the flow path, comprising first and second oppositely disposed dished plates defining an annular hollow casing, said first plate having inlet means to take fluid into said casing and said second plate having outlet means for flow of fluid from said casing, a generally planar baffle plate disposed between and engaging said first and second plates and dividing said casing to provide spaced independent first and second annular fluid chambers on the opposite sides of said baffle plate respectively communicating with said inlet and outlet means, and first and second spaced conduit means, said baffle plate having means directing flow from said first annular chamber to said first conduit means and from said second conduit means to said second annular chamber, said first conduit means extending between said first annular chamber and said fluid treating apparatus for flow of fluid from said first chamber to said apparatus and said second conduit means extending between said fluid treating apparatus and said second annular chamber for flow of fluid from said apparatus to said second chamber.

2. A fluid diverter device adapted to be disposed in a fluid flow path and to divert fluid to a fluid treating apparatus and return it to the flow path, comprising first and second oppositely disposed dished plates defining an annular hollow casing, said first plate having inlet means to take fluid into said casing and said second plate having outlet means for flow of fluid from said casing, a baffle plate disposed between and engaging said casing plates and dividing said casing to provide spaced independent first and second annular fluid chambers respectively communicating with said inlet and outlet means, said first and second plates and said baffle plate having coextensive engaged tab portions, the tab portions of said first and second plates extending laterally from said annular chambers and overlying and being in spaced relation to said tab portion of said baffle plate to provide spaced first and second fluid passages respectively communicating with said first and second chambers, and spaced first and second conduit means respectively connected to said first and second fluid passages and to said fluid treating apparatus for flow of fluid from said first chamber to said apparatus and for flow of fluid from said apparatus to said second chamber.

3. A fluid diverter device as claimed in claim 2 wherein said plates are sheet metal, said dished plates being formed as stampings having substantially identical configurations.

4. A fluid diverter device as claimed in claim 3 wherein said plates are aluminum.

5. A fluid diverter device as claimed in claim 2 wherein said plates are plastic.

6. A fluid diverter device as claimed in claim 2 wherein said inlet means comprise a plurality of openings in an annular array in said first dished plate, and said outlet means comprise a plurality of openings in annular array in said second dished plate.

7. A fluid diverter device as claimed in claim 2 wherein said fluid treating apparatus comprise a fluid cooler.

8. A fluid diverter device as claimed in claim 2 wherein said first and second dished plates have crown portions cooperating with said baffle plate to provide said annular chambers; said plates having connected circular rim portions surrounding said crown portions; and a sealing ring gasket adapted to be positioned on at least one crown portion of said casing to engage an adjacent structure.

9. A fluid diverter device as claimed in claim 2 wherein said tab portion of said second plate is provided with spaced openings, and said first and second conduit means are a pair of tubes extending through said openings and receiving fluid from said passages.

10. A fluid diverter device as claimed in claim 2 wherein said first dished plate is provided with annular grooves in radially spaced relation, and a seal gasket is disposed in one or the other of said grooves.

11. A fluid diverter device as claimed in claim 2 wherein said first and second plates and said baffle plate have radially outer rims and radially inner rims, the radially outer rim of said baffle plate extending between and being connected to the radially outer rims of said first and second plates, and the radially inner rim of said baffle plate extending between and being connected to the radially inner rims of said first and second plates and defining a central opening therethrough.

12. A fluid diverter device as claimed in claim 11 wherein a tubular fitting extends through said central opening and is operatively connected to the annular casing and spaced from said chambers.

13. A fluid diverter device as claimed in claim 12 wherein said conduit means are spaced tubes connected to the tab portion of said second plate, said tubes and said tubular fitting being in parallel relation to each other.

14. A fluid diverter device as claimed in claim 2 wherein said fluid is oil, the oil flow path is between an engine and an oil filter, and the fluid treating apparatus is a heat exchanger; said first dished plate being formed to engage the engine and to define an annular compartment therewith for receiving oil flowing from the engine, said compartment communicating with said inlet means; and said second dished plate being formed to engage the oil filter and to define an annular compartment for receiving oil flowing from the outlet means to the filter.

15. A fluid diverter device as claimed in claim 14 wherein said dished plates have annular crowns, and sealing gasket rings positioned between the crown of the first plate and the engine and between the crown of the second plate and the filter.

16. A fluid diverter device as claimed in claim 15 wherein said inlet means comprise a plurality of openings in annular array in said first plate and said outlet means comprise a plurality of openings in annular array in said second plate.

17. A fluid diverter device as claimed in claim 15 wherein said casing has a central opening, and a tubular member extending through the opening and threaded at the opposite ends thereof to have threaded engagement with said filter and said engine.

18. A fluid diverter device as claimed in claim 17 wherein said tubular fitting has a central flange engaging the annular casing and is threaded internally at one end and threaded externally at the opposite end.

19. A fluid diverter device adapted to be disposed in a fluid flow path and to divert fluid to a fluid treating apparatus and return it to the flow path, comprising first and second oppositely disposed dished plates defining an annular hollow casing, said first plate having inlet means to take fluid into said casing and said second plate having outlet means for flow of fluid from said casing, a baffle plate disposed between and engaging said casing plates and dividing said casing to provide spaced independent first and second annular fluid chambers respectively communicating with said inlet and outlet means, and spaced tubes respectively connected to said fluid chambers and said fluid treating apparatus for flow of fluid from said first chamber to said apparatus and for flow of fluid from said apparatus to said second chamber, said first and second plates and said baffle plate having coextensive engaged tab portions, the tab portions of said first and second plates extending from said annular chambers and overlying and being in spaced relation to said tab portion of said baffle plate to provide spaced fluid passages communicating between said chambers and said tubes, said tab portion of said second plate having spaced openings and said tubes extending through said openings and communicating with said passages, said tab portion of said baffle plate having a downward embossment and an upward embossment, said downward embossment having an opening aligned with one opening in the tab portion of the second plate to receive the end of one tube, the upward embossment being generally aligned with the other opening in the tab portion of the second plate and spaced from the end of the other tube.

* * * * *

UNITED STATES PATENT OFFICE
CERTIFICATE OF CORRECTION

Patent No. 3,862,037   Dated January 21, 1975

Inventor(s) Desmond Mcintosh Donaldson et al.

It is certified that error appears in the above-identified patent and that said Letters Patent are hereby corrected as shown below:

On the Cover Sheet, in Item [75], "Trusxott" should read -- Truscott --.

Signed and sealed this 29th day of April 1975.

(SEAL)
Attest:

RUTH C. MASON
Attesting Officer

C. MARSHALL DANN
Commissioner of Patents
and Trademarks